US010998995B2

(12) United States Patent
Rico Alvarino et al.

(10) Patent No.: US 10,998,995 B2
(45) Date of Patent: *May 4, 2021

(54) TECHNIQUES AND APPARATUSES FOR CHANNEL PROCESSING BACKWARDS COMPATIBILITY

(71) Applicant: QUALCOMM Incorporated, San Diego, CA (US)

(72) Inventors: Alberto Rico Alvarino, San Diego, CA (US); Peter Gaal, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,757

(22) Filed: Feb. 25, 2020

(65) Prior Publication Data
US 2020/0195364 A1    Jun. 18, 2020

Related U.S. Application Data

(63) Continuation of application No. 15/715,706, filed on Sep. 26, 2017, now Pat. No. 10,608,770.

(30) Foreign Application Priority Data

Mar. 23, 2017  (IN) ............................ 201741010254

(51) Int. Cl.
*H04J 11/00*    (2006.01)
*H04W 72/08*   (2009.01)
(Continued)

(52) U.S. Cl.
CPC ......... *H04J 11/005* (2013.01); *H04J 11/0056* (2013.01); *H04W 28/04* (2013.01);
(Continued)

(58) Field of Classification Search
CPC ............... H04W 28/04; H04W 72/082; H04W 74/0833; H04L 1/06; H04L 5/001;
(Continued)

(56) References Cited

U.S. PATENT DOCUMENTS 8,611,447 B1 * 12/2013 Gomadam ........... H04B 7/0452
                                                                 375/260
10,608,770 B2 * 3/2020 Rico Alvarino ...... H04L 5/0053
(Continued)

FOREIGN PATENT DOCUMENTS

WO    2011038272 A1    3/2011
WO    2015142277 A1    9/2015

OTHER PUBLICATIONS

Ericsson: "Random Access for MTC", 3GPP Draft; R1-156420, Random Access for MTC, 3rd Generation Partnership Project (3GPP), Mobile Competence Centre; 650, Route Des Lucioles; F-06921 Sophia-Antipolis Cedex; France, vol. RAN WG1, No. Anaheim, USA; Nov. 15, 2015-Nov. 22, 2015 , Nov. 15, 2015 (Nov. 15, 2015), XP051002888, pp. 1-10, Retrieved from the Internet: URL: http://www.3gpp.org/ftp/Meetings_3GPP SYNC/RAN 1/Docs/ [retrieved on Nov. 15, 2015].
(Continued)

*Primary Examiner* — Raymond S Dean
(74) *Attorney, Agent, or Firm* — Qualcomm Incorporated

(57) ABSTRACT

A base station (BS) may transmit, and a user equipment (UE) may receive, a physical channel, such as a narrowband physical downlink control channel (NPDCCH) or a narrowband physical downlink shared channel (NPDSCH). In an interference-limited scenario in a network, it may be desirable to perform additional processing to introduce interference randomization into the control channel to ensure that the UE can recover data of the control channel. Some types of UEs, such as legacy UEs, may not be capable of recovering the control channel when the additional processing is
(Continued)

performed. In some aspects, the BS may identify a type of UE associated with a cell, and may transmit a physical channel processed using a processing scheme selected based at least in part on the type of UE associated with the cell.

26 Claims, 13 Drawing Sheets

(51) Int. Cl.
    *H04W 28/04* (2009.01)
    *H04W 74/08* (2009.01)
    *H04L 1/06* (2006.01)
    *H04L 5/00* (2006.01)
    *H04L 25/02* (2006.01)

(52) U.S. Cl.
    CPC ........ *H04W 72/082* (2013.01); *H04J 11/0073* (2013.01); *H04J 11/0076* (2013.01); *H04L 1/06* (2013.01); *H04L 5/001* (2013.01); *H04L 25/0202* (2013.01); *H04W 74/0833* (2013.01)

(58) Field of Classification Search
    CPC .. H04L 25/0202; H04L 15/001; H04J 11/005; H04J 11/0056; H04J 11/0073; H04J 11/0076
    See application file for complete search history.

(56) References Cited

U.S. PATENT DOCUMENTS

| | | | |
|---|---|---|---|
| 2009/0323957 A1* | 12/2009 | Luo | H04J 11/0069 380/270 |
| 2012/0064932 A1 | 3/2012 | Lim et al. | |
| 2013/0012203 A1* | 1/2013 | Moulsley | H04L 5/0053 455/434 |
| 2013/0034064 A1* | 2/2013 | Nam | H04L 5/0091 370/329 |
| 2013/0083752 A1* | 4/2013 | Kim | H04L 5/0048 370/329 |
| 2014/0169260 A1* | 6/2014 | Nishio | H04W 74/0833 370/312 |
| 2015/0117351 A1* | 4/2015 | Nagata | H04J 1/00 370/329 |
| 2015/0223228 A1* | 8/2015 | Rune | H04W 72/0413 370/311 |
| 2017/0201393 A1 | 7/2017 | Gaal et al. | |
| 2018/0139025 A1 | 5/2018 | Rico Alvarino et al. | |

OTHER PUBLICATIONS

International Search Report and Written Opinion—PCT/US2018/019471—ISA/EPO—dated May 2, 2018.

\* cited by examiner

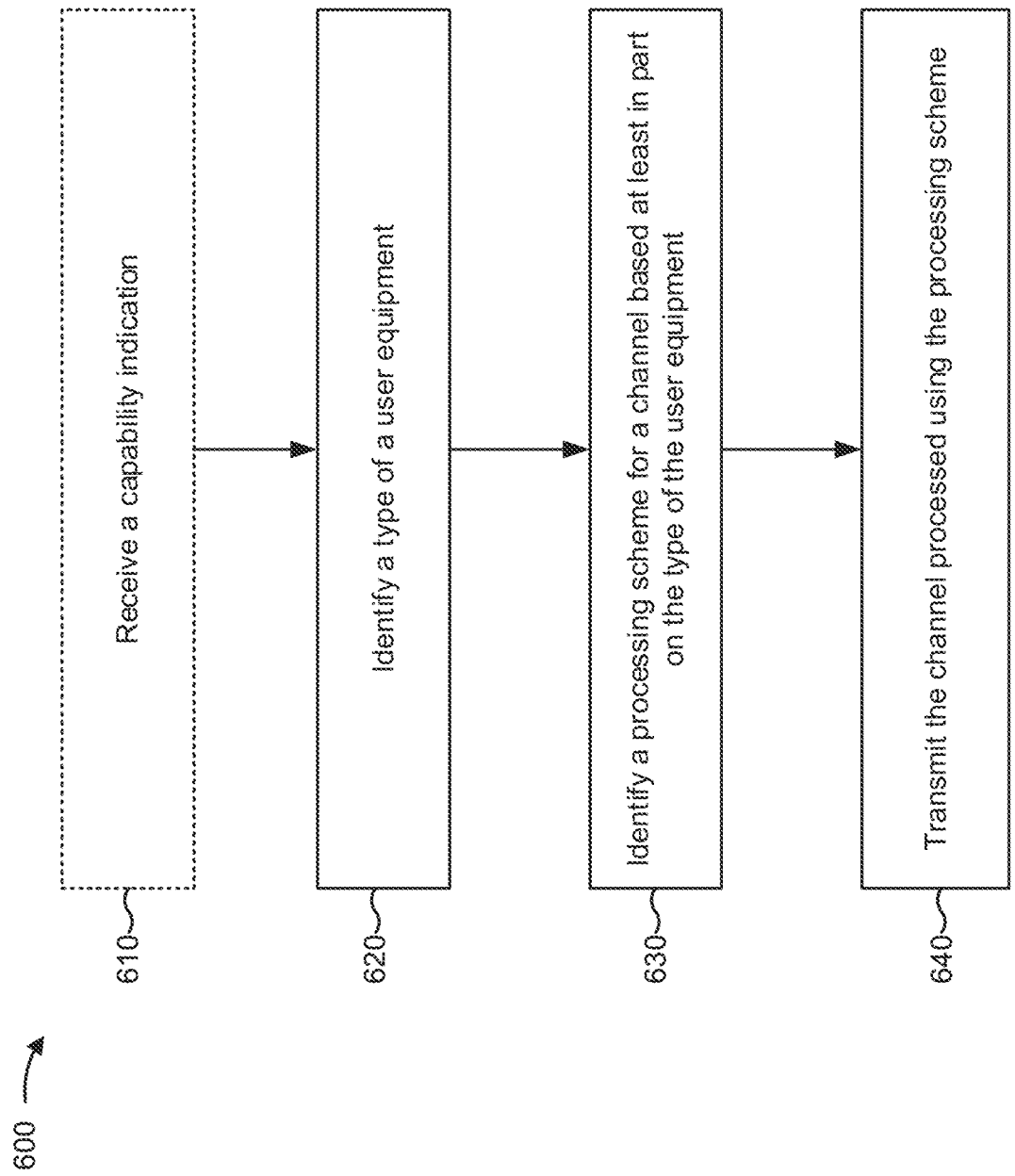

TECHNIQUES AND APPARATUSES FOR CHANNEL PROCESSING BACKWARDS COMPATIBILITY

CROSS-REFERENCE TO RELATED APPLICATIONS UNDER 35 U.S.C. § 119

This application is a continuation of U.S. patent application Ser. No. 15/715,706, entitled "TECHNIQUES AND APPARATUSES FOR CHANNEL PROCESSING BACKWARDS COMPATIBILITY," filed Sep. 26, 2017, which claims priority to Indian Patent Application 201741010254 filed on Mar. 23, 2017 entitled "TECHNIQUES AND APPARATUSES FOR CHANNEL PROCESSING BACKWARDS COMPATIBILITY," which are incorporated by reference herein.

BACKGROUND

Field

Aspects of the present disclosure generally relate to wireless communication, and more particularly to techniques and apparatuses for channel processing backwards compatibility.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

A BS may transmit a channel, such as a control channel, to provide information to a UE. For example, the BS may transmit a narrowband physical downlink control channel (NPDCCH) to provide service to an Internet of Things (IoT) type of UE. The control channel may be processed using a particular processing scheme. For example, the BS may scramble the NPDCCH based at least in part on applying a scrambling sequence to repetitions of the NPDCCH. In this case, the BS may repeat symbols across a plurality of consecutive transmissions of a subframe of the NPDCCH using the same scrambling sequence for each of the plurality of consecutive transmissions. However, in an interference limited-scenario, repetitions of a first symbol of a first cell may interfere with repetitions of a second symbol of a second cell. A UE that is to receive the first symbol of the first cell may be unable to overcome the interference of the second symbol transmitted by the second cell using, for example, averaging techniques or symbol combining techniques.

SUMMARY

Aspects described herein provide a mechanism by which a BS may transmit, and a UE may receive a channel, such as a control channel, in an interference-limited scenario. It has been considered to utilize other techniques for processing of the control channel, such as reinitializing a scrambling sequence for sets of bits of the control channel, reinitializing a scrambling sequence for each bit of the control channel, applying a rotation sequence to symbols of the control channel, or a combination thereof. In this way, the BS may provide an interference randomized control channel to compensate for interference of the control channel with another control channel, and the UE may receive the interference randomized control channel and recover data of the control channel. However, although a first type of UE may be configured to receive the interference randomized control channel and reverse a processing scheme applied to the control channel, a second type of UE (e.g., a legacy UE) may be incapable of reversing the processing scheme applied to the control channel, which may result in poor network performance in a network that includes the second type of UE. Thus, it may be beneficial for the BS to provide backwards compatibility for the second type of UE.

Aspects, described herein, may enable transmission and reception of a control channel by both the first type of UEs that are configured for interference randomization processing schemes and the second type of UEs that are not configured for interference randomization processing schemes. The BS may identify a type of UE associated with a cell. For example, the BS may determine that the first type of UE is operating in the cell, the second type of UE is operating in the cell, or a combination thereof. Based at least in part on the type of UE associated with the cell, the BS may apply a processing scheme to the control channel, such as applying a legacy processing scheme that does not introduce interference randomization when the second type of UE is operating in the network, applying an interference randomization processing scheme when the first type of UE is operating in the network, or a combination thereof. This may ensure that the UE can reverse the processing scheme applied to the control channel to recover data of the control channel.

In an aspect of the disclosure, a method, a device, an apparatus, and a computer program product are provided.

In some aspects, the method may include receiving, by a base station, a capability indication from a user equipment associated with a cell. The method may include identifying, by the base station, a processing scheme for a channel of a cell based at least in part on the capability indication. The capability indication may identify a type of the user equipment associated with the cell. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel. The method may include transmitting, by the base station, the channel processed using the processing scheme based at least in part on identifying the processing scheme.

In some aspects, the device may include a memory and one or more processors coupled to the memory. The memory and the one or more processors may be configured to receive a capability indication from a user equipment associated with a cell. The memory and the one or more processors may be configured to identify a processing scheme for a channel of a cell based at least in part on the capability indication. The capability indication may identify a type of the user equipment associated with the cell. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel. The memory and the one or more processors may be configured to transmit the channel processed using the processing scheme based at least in part on identifying the processing scheme.

In some aspects, the apparatus may include means for receiving a capability indication from a user equipment associated with a cell. The apparatus may include means for identifying a processing scheme for a channel of a cell based at least in part on the capability indication. The capability indication may identify a type of the user equipment associated with the cell. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel. The apparatus may include means for transmitting the channel processed using the processing scheme based at least in part on identifying the processing scheme.

In some aspects, the computer program product may include a non-transitory computer-readable medium storing one or more instructions for wireless communication that, when executed by one or more processors of a device, cause the one or more processors to receive a capability indication from a user equipment associated with a cell. The one or more instructions, when executed by the one or more processors, may cause the one or more processors to identify a processing scheme for a channel of a cell based at least in part on the capability indication. The capability indication may identify a type of the user equipment associated with the cell. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel. The one or more instructions, when executed by the one or more processors, may cause the one or more processors to transmit the channel processed using the processing scheme based at least in part on identifying the processing scheme.

In some aspects, the method may include transmitting, by a user equipment, a capability indication to a base station associated with a cell. The capability indication may identify a type of the user equipment. The method may include receiving, by the user equipment, a channel of the cell processed using a processing scheme identified based at least in part on the capability indication. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel.

In some aspects, the device may include a memory and one or more processors coupled to the memory. The memory and the one or more processors may be configured to transmit a capability indication to a base station associated with a cell. The capability indication may identify a type of a user equipment. The memory and the one or more processors may be configured to receive a channel of the cell processed using a processing scheme identified based at least in part on the capability indication. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel.

In some aspects, the computer program product may include a non-transitory computer-readable medium storing one or more instructions for wireless communication that, when executed by one or more processors of a device, cause the one or more processors to transmit a capability indication to a base station associated with a cell. The capability indication may identify a type of a user equipment. The one or more instructions, when executed by the one or more processors, may cause the one or more processors to receive a channel of the cell processed using a processing scheme identified based at least in part on the capability indication. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel.

In some aspects, the apparatus may include means for transmitting a capability indication to a base station associated with a cell. The capability indication may identify a type of a user equipment. The apparatus may include means for receiving a channel of the cell processed using a processing scheme identified based at least in part on the capability indication. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel.

Aspects generally include a method, apparatus, system, computer program product, non-transitory computer-readable medium, user equipment, base station, wireless communication device, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 6 is a flow chart of a method of wireless communication.

DETAILED DESCRIPTION

Figure 1:
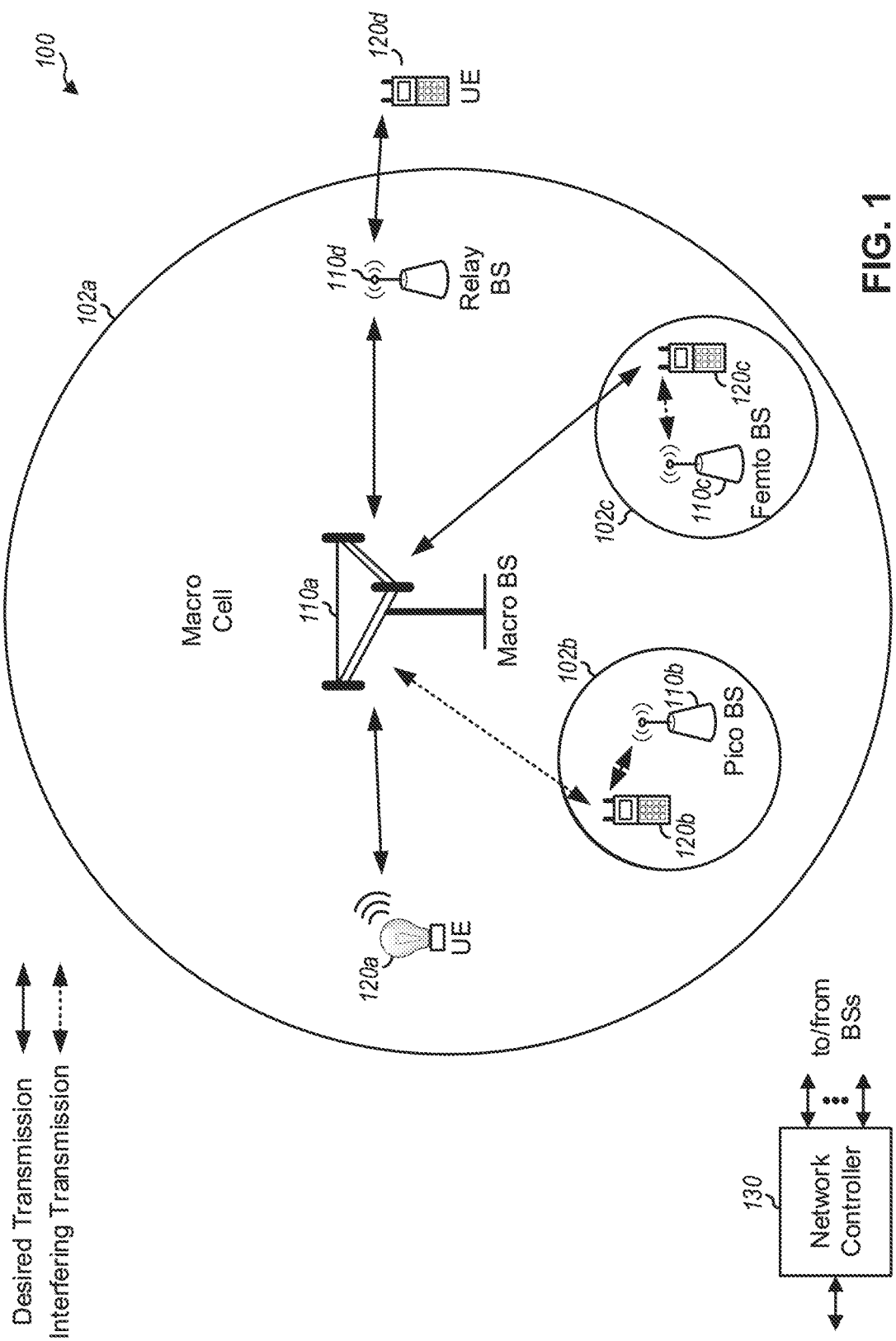
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller ("RNC"), an eNodeB (eNB), a Base Station Controller ("BSC"), a Base Transceiver Station ("BTS"), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may communicate with the BSs to determine a scrambling sequence or rotation sequence that is to be used as a processing scheme for a channel, such as a control channel. For example, network controller 130 may determine that a first cell associated with a first BS is to use a first scrambling sequence and a second cell associated with a second BS is to use a second scrambling sequence to introduce interference randomization for a first control channel provided by the first BS and a second control channel provided by the second BS. Additionally, or alternatively, network controller 130 may determine that BSs are to perform a set of phase rotations to introduce interference randomization for the first control channel and the second control channel. In some aspects, network controller 130 may communicate with the BSs to determine a processing scheme to apply to a control channel. For example, based at least in part on identifying a legacy type of UE operating in a cell, network controller 130 may cause a BS to use a legacy processing scheme for at least a portion of the control channel to provide backward compatibility for the legacy type of UE. Additionally, or alternatively, based at least in part on identifying a non-legacy type of UE operating in the cell, network controller 130 may cause the BS to use a non-legacy processing scheme for at least a portion of the control channel to introduce interference randomization to the control channel to compensate for an interference-limited scenario.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone, such as UEs 120b and/or 120d), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices (e.g., such as UE 120c), wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a smart home device (e.g., a smart appliance, a smart light bulb, such as UE 120a) or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). In some aspects, a UE, such as UE 120, may be classified as a particular type of UE, such as a first type of UE or a second type of UE, a legacy UE (e.g., which may be a 3GPP Release 13 UE or an earlier version of a UE) or a non-legacy UE (e.g., which may be a 3GPP Release 14 UE or a later version of a UE), and/or the like. Although aspects are described herein in terms of a first UE and a second UE, a legacy UE and a non-legacy UE, a 3GPP Release 13 or earlier UE and a 3GPP Release 14 or later UE, and/or the like, other classifications of UEs are possible, such as compatible and non-compatible UEs, updated and non-updated UEs, and/or the like.

In FIG. 1, a solid line with double arrows indicates candidate transmissions between a UE and a serving BS, which is a BS designated to serve the UE on the downlink and/or uplink. A dashed line with double arrows indicates potentially interfering transmissions between a UE and a BS. For example, an interference-limited scenario may occur when macro BS 110a is operating synchronously with pico BS 110b resulting in a transmission of a control channel from macro BS 110a to UE 120a interfering with a transmission of a control channel from pico BS 110b to UE 120b. Similarly, an interference-limited scenario may occur when a control channel transmission of femto BS 110c interferes with the control channel transmission of macro BS 110a to UE 120c. In some aspects, BSs, such as macro BS 110a and pico BS 110b, may transmit respective control channels with bits that are processed using a first processing scheme, such as when a legacy UE is operating in a cell, to provide backwards compatibility for the legacy UE to receive the control channel and determine information conveyed by the control channel. Additionally, or alternatively, the BSs may transmit respective control channels with bits that are processed using a second processing scheme, such as when a non-legacy UE is operating in a cell, to reduce interference and to permit the non-legacy UE, such as UE 120b, to receive the control channel and determine information conveyed by the control channel.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station, a network controller, a user equipment, etc.) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the scheduling entity may schedule transmission of channels, such as a narrowband physical broadcast channel (NB-PBCH), a narrowband physical downlink control channel (NPDCCH), a physical downlink shared channel (PDSCH), and/or the like, from BSs to UEs. In some aspects, such scheduling information may be communicated via signaling from the scheduling entity. For example, a UE may receive a system information block (SIB) message, a radio resource control (RRC) reconfiguration message, and/or the like identifying a resource allocation for a control channel, a processing scheme to be applied to a control channel, a set of scrambling sequences to be applied to a control channel, a phase rotation to be applied to a control channel, a cross-subframe coding (e.g., the channel is processed without repetitions of portions of the channel), and/or the like.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
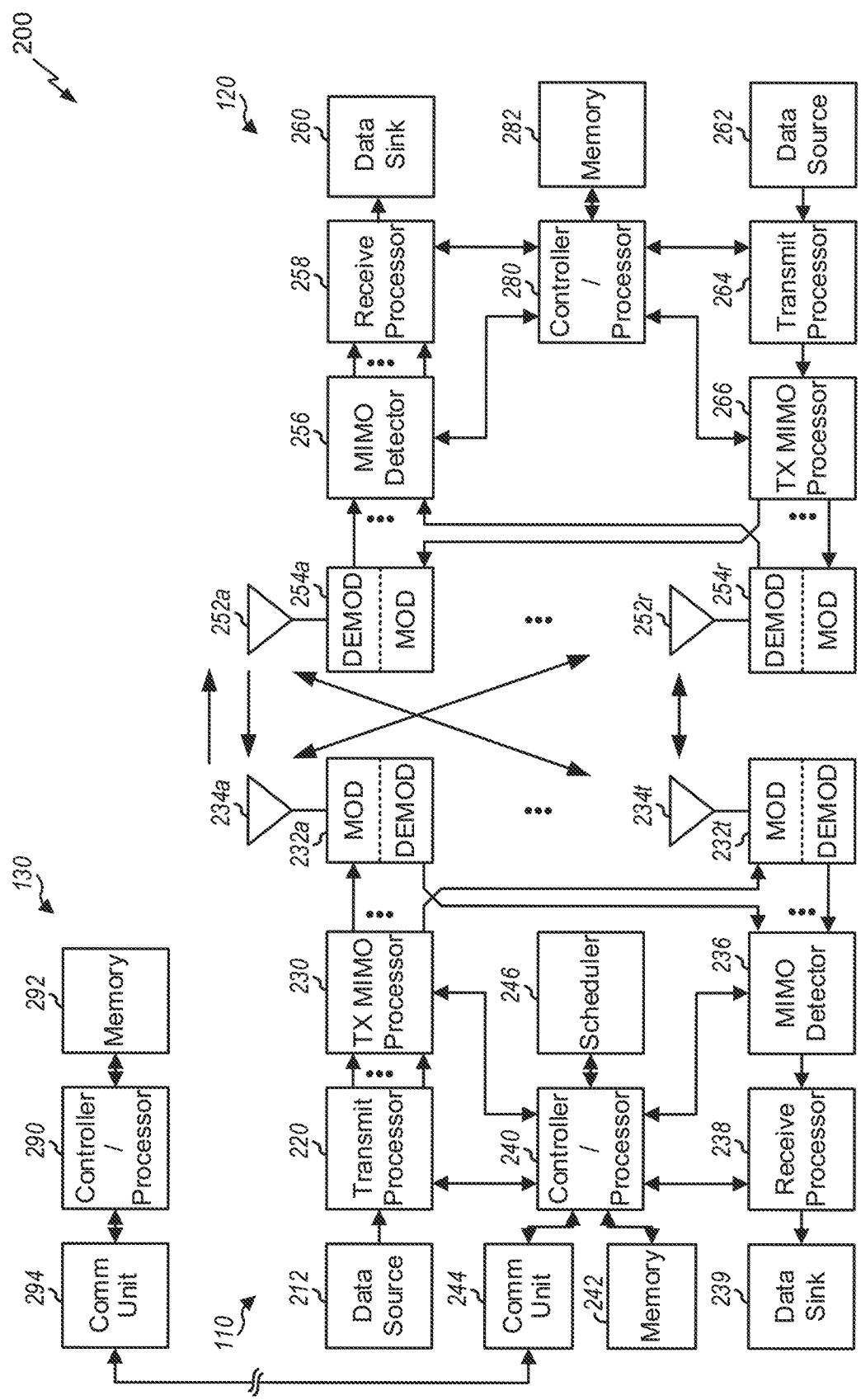
FIG. 2 is a diagram illustrating an example of a base station (BS) in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. Each modulator 232 and/or another component, such as transmit processor 220, TX MIMO processor 230, controller/processor 240, and/or the like, may further process modulated symbols (e.g., IQ symbols) of a control channel (e.g., QPSK symbols) to apply a phase rotation or scrambling sequence to the modulated symbols based at least in part on identifying a processing scheme for the control channel and/or based at least in part on a cell identifier, such as a cell identity (cell ID or CID). In some aspects, each modulator 232 and/or another component, such as transmit processor 220, TX MIMO processor 230, controller/processor 240, and/or the like, may further process modulated symbols of the control channel to apply multiple processing stages, such as a first processing stage (e.g., a set of scrambling sequences applied to a set of blocks), a second processing stage (e.g., a set of scrambling sequences applied to repetitions of a repeating subset of bits of each block), and/or the like to introduce interference randomization into the control channel to compensate for an interference-limited scenario. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. Each demodulator 254 and/or another component, such as MIMO detector 256, receiver processor 258, controller/processor 280, and/or the like, may further process the input samples to reverse the processing of bits included in a control channel. A MIMO detector 256 may obtain received symbols from all R demodulators 254a through 254r, perform MIMO detection on the received symbols if applicable, and provide detected symbols. A receive processor 258 may process (e.g., de-rotate, demodulate, decode, or de-scramble) the detected symbols, provide decoded data for UE 120 to a data sink 260, and provide decoded control information and system information to a controller/processor 280. A channel processor may determine a reference signal received power (RSRP), a received signal strength indicator (RS SI), a reference signal received quality (RSRQ), a CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively. For example, controller/processor 240 of base station 110 and/or other processors and modules at base station 110 may receive a capability indication identifying a type of UE 120, identify a processing scheme based at least in part on the type of UE 120, and transmit a control channel processed using the processing scheme based at least in part on identifying the processing scheme. Additionally, or alternatively, controller/processor 280 and/or one or more other processors and modules at UE 120 may transmit a capability indication identifying a type of UE 120, receive a processing scheme indication identifying a processing scheme for a channel, and receive the channel of a cell processed using the processing scheme identified based at least in part on the type of UE 120. In some aspects, one or more of the components shown in FIG. 2 may be employed to perform example method 600 of FIG. 6, example method 900 of FIG. 9, and/or other processes for the techniques described herein. Memories 242 and 282 may store data and program codes for BS 110 and UE 120, respectively. A scheduler 246 may schedule UEs for data transmission on the downlink and/or uplink. For example, scheduler 246 may schedule a base station 110 to transmit a control channel processed using a processing scheme identified based at least in part on a type of UE 120 associated with a cell.

As indicated above, FIG. 2 is provided merely as an example. Other examples are possible and may differ from what was described with regard to FIG. 2.

Figure 3:
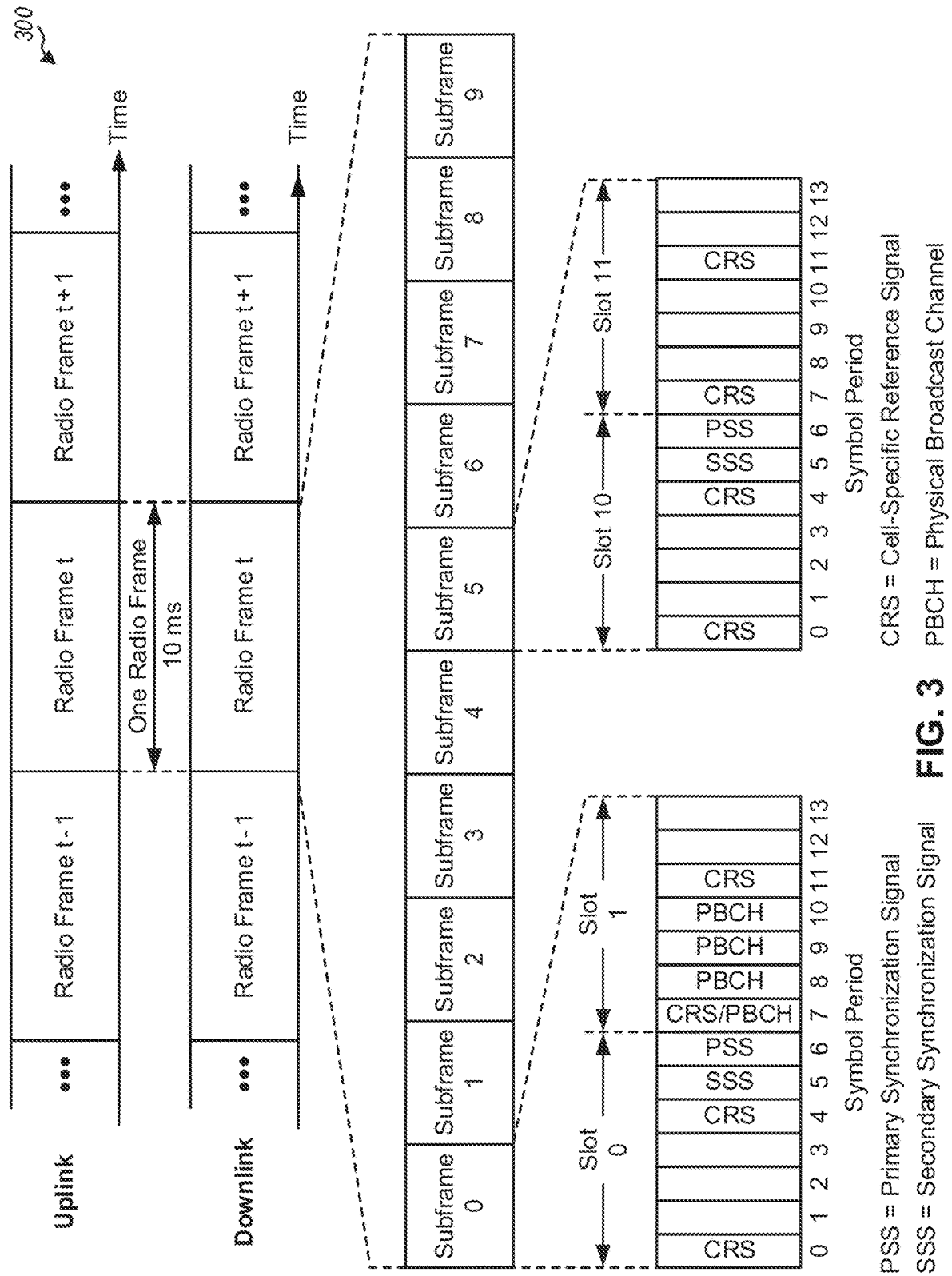
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search, acquisition, cell identity determination, de-scrambling, and phase de-rotation. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a control channel.

In some aspects, the BS may transmit a control channel processed using a first processing scheme. For example, the BS may transmit repetitions of portions of data of the control channel with each repetition using a common scrambling sequence. In this way, the BS may ensure compatibility with a type of UE that is not configured to receive an interference randomized control channel. In some aspects, the BS may transmit a control channel using a second processing scheme. For example, the BS may apply different scrambling sequences to different repetitions, different scrambling sequences to different portions of repetitions, different phase rotations to different portions of repetitions, and/or the like. In this way, the BS may reduce interference or randomize the interference between control channels provided by the BS and another BS.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
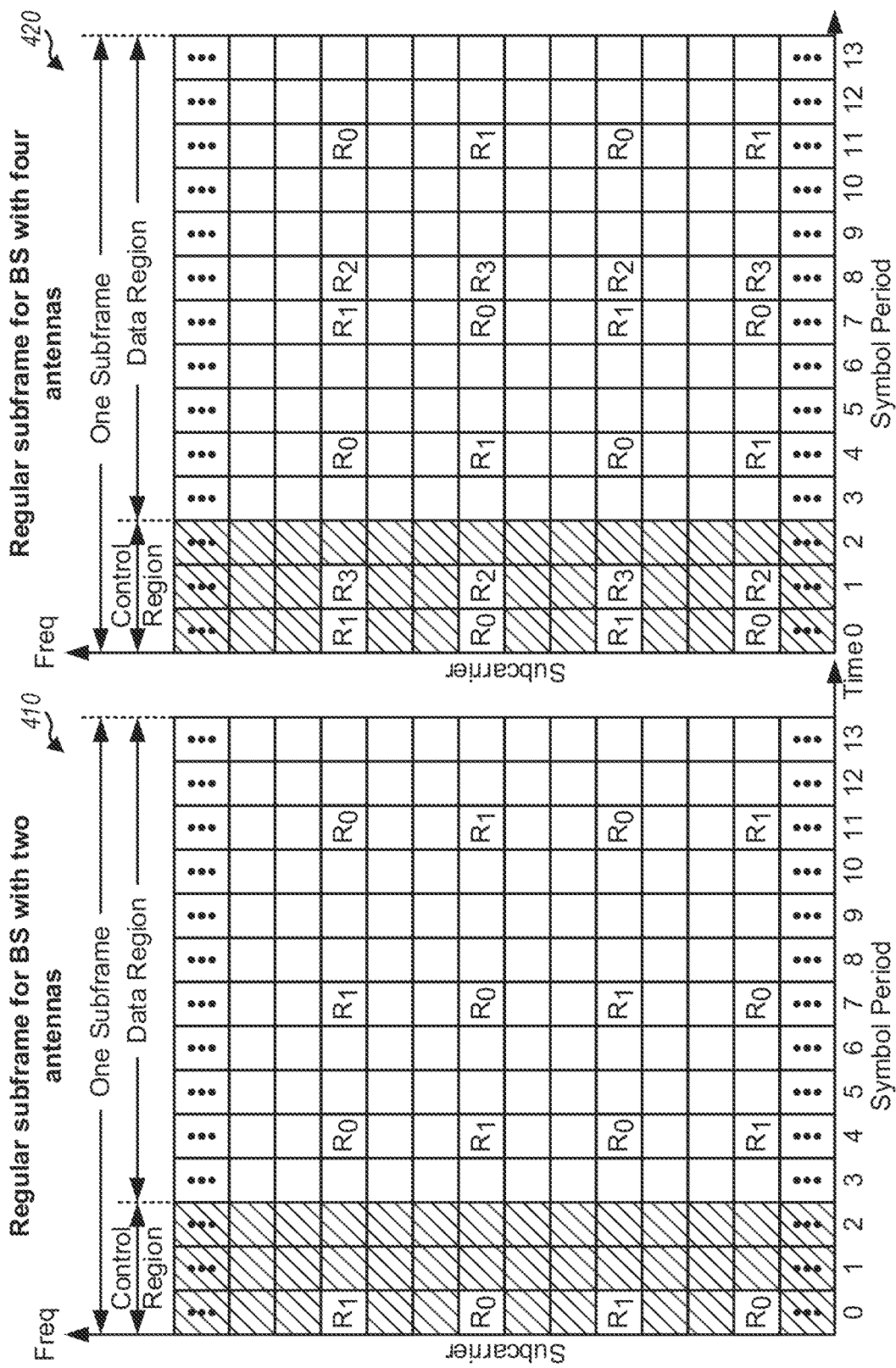
FIG. 4 is a diagram illustrating two example subframe formats with a normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Bits of the modulation symbol may be processed using a processing scheme to, for example, compensate for interference on a control channel. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario (an interference-limited scenario) in which the UE may observe high interference from one or more interfering BSs. In such a scenario and based at least in part on a type of the UE or a type of another UE operating in the dominant interference scenario, the BS may identify a processing scheme, the BS may process (e.g., scramble, offset, and/or phase rotate) bits that are transmitted via a control channel, and the UE may receive the control channel and may reverse the processing of the bits to determine information conveyed via the control channel.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5A:
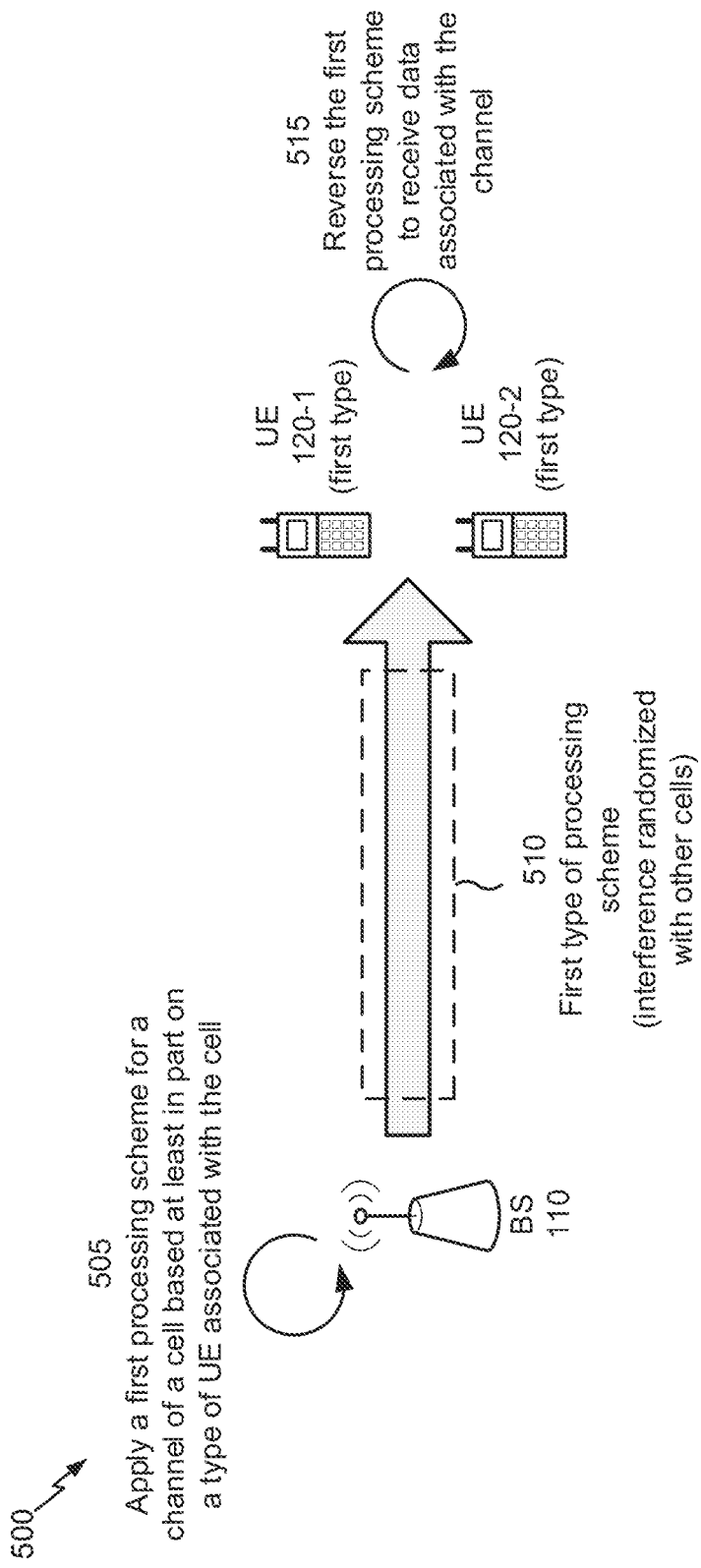
FIGS. 5A-5C are diagrams illustrating an example of channel processing backward compatibility.
Figure 5B:
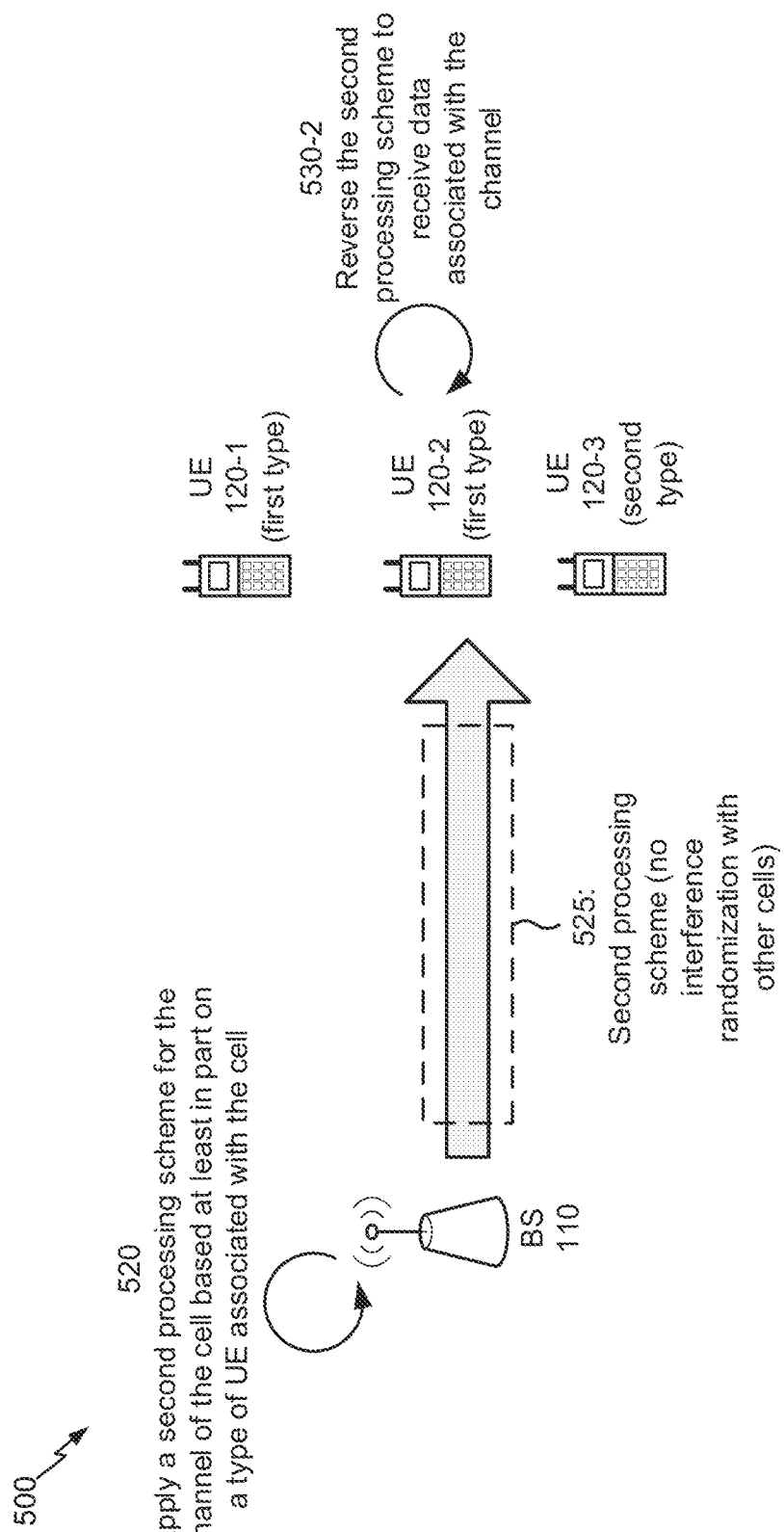
Figure 5C:
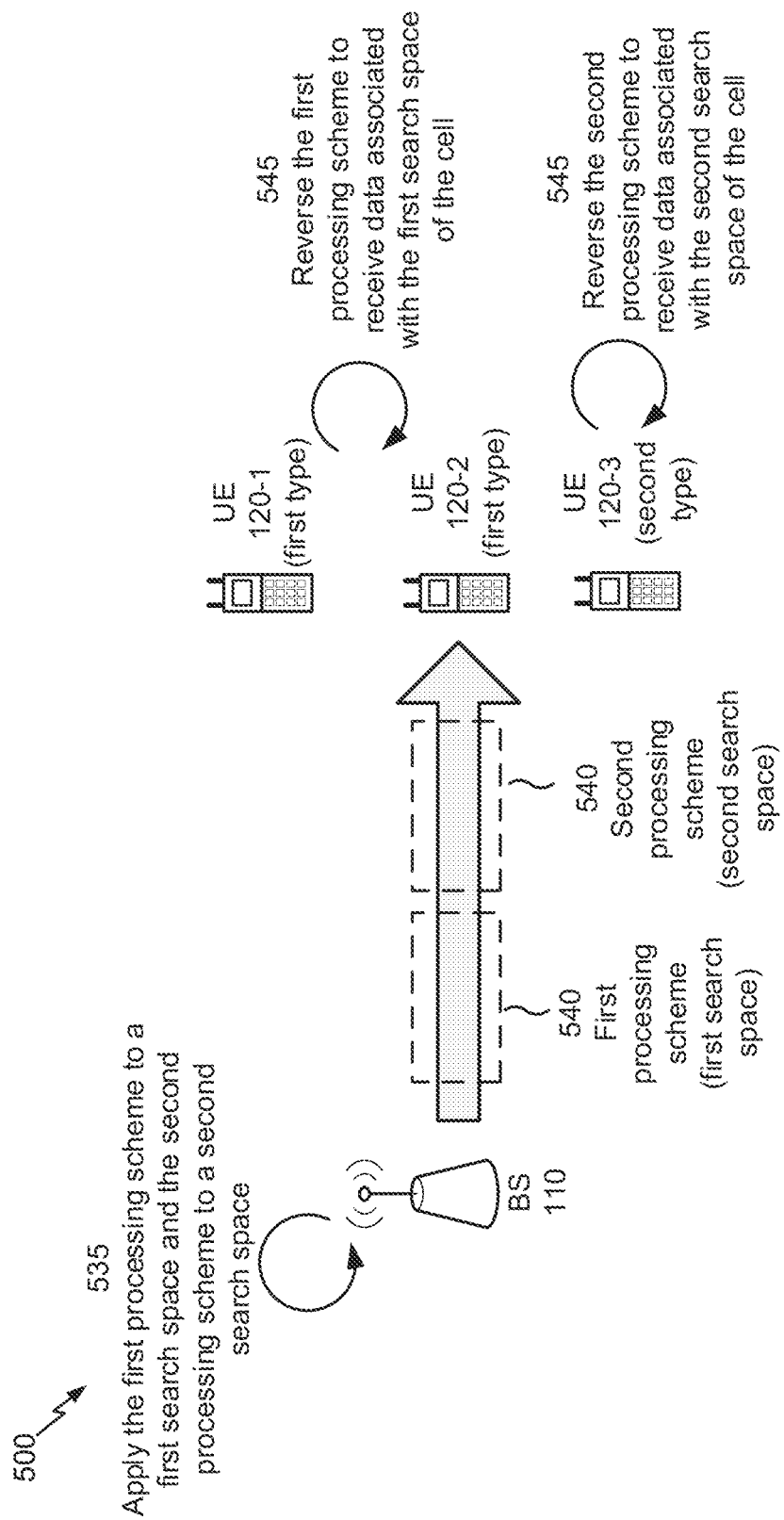

FIGS. 5A-5C are diagrams illustrating an example 500 of a BS transmitting a control channel to provide control channel processing backward compatibility. As shown in FIGS. 5A-5C, example 500 may include a BS 110 and a set of UEs 120 (e.g., a UE 120-1, a UE 120-2, a UE 120-3, and/or the like).

In FIG. 5A, and at 505, BS 110 applies a first processing scheme for a channel (e.g., a control channel) of a cell based at least in part on a type of UE associated with the cell. For example, BS 110 may determine that UE 120-1 and UE 120-2 are each a first type of UE that is configured to receive an interference randomized control channel (e.g., an NPDCCH processed using a processing scheme to compensate for interference with another NPDCCH transmitted for another cell). In some aspects, BS 110 may identify a type of UE before applying the first processing scheme. For example, BS 110 may receive a configuration message or a capability message from UEs 120, such as a message identifying a 3GPP release version of UE 120-1 and UE 120-2 that identifies that UE 120-1 and UE 120-2 as the first type of UE. In some aspects, BS 110 may determine that UE 120-1 and UE 120-2 are associated with the first type based at least in part on a type of carrier, such as an anchor carrier or a non-anchor carrier, associated with UE 120-1 and UE 120-2. For example, BS 110 may determine that the type of carrier associated with UE 120-1 and UE 120-2 is associated with the first type of UE and not a second type of UE, and may determine that UE 120-1 and UE 120-2 are the first type of UE. In some aspects, BS 110 may identify the first processing scheme to utilize for the channel based at least in part on a type of the channel, such as based at least in part on determining that the channel is a physical channel, a broadcast channel, a data channel, a shared channel, a control channel, a combination thereof, and/or the like. In some aspects, BS 110 may identify a type of another UE 120 before applying the first processing scheme. For example, BS 110 may determine that a second type of UE 120 is not operating in a cell, and may determine to use the first processing scheme for the cell based at least in part on determining that the second type of UE 120 is not operating in the cell. In some aspects, BS 110 may determine that UE 120-1 and UE 120-2 are associated with the first type based at least in part on a type of service, such as a single cell point to multipoint (SC-PTM) service, associated with UE 120-1 and UE 120-2.

In some aspects, BS 110 may utilize the first processing scheme to compensate for interference in an interference-limited scenario. In some aspects, the first processing scheme may include multiple processing stages. For example, the first processing scheme may include a first processing stage initialized based at least in part on a cell identifier and applied to each block of a plurality of blocks of the channel, and a second processing stage initialized based at least in part on the cell identifier and applied to each repetition of a repeating subset of bits of each block to cause a particular repetition of a first block and a corresponding particular repetition of a second block to be processed using a common processing scheme. In this case, the common processing scheme may include a common scrambling sequence, a common rotation sequence, and/or the like. In some aspects, the first processing scheme may include a phase rotation. For example, the first processing scheme may include applying a phase rotation to symbols of the channel, such as applying a phase rotation to scrambled sets of symbols of the channel. In this way, BS 110 may compensate for interference from one or more other cells in the interference-limited scenario.

For example, for a narrowband physical downlink shared channel (NPDSCH) transmission, BS 110 may map the NPDSCH to a plurality of subframes, and for each antenna port, may map a block of complex-valued symbols to a group of resource elements. For repetitions of blocks of complex-valued symbols, BS 110 may multiply each complex valued symbol by $\theta_{n_j,n_s}(i)$, where:

$$\theta_{n_j,n_s}(i) = \begin{cases} 1, & \text{if } c_{n_j,n_s}(2i) = 0 \text{ and } c_{n_j,n_s}(2i+1) = 0 \\ -1, & \text{if } c_{n_j,n_s}(2i) = 0 \text{ and } c_{n_j,n_s}(2i+1) = 1 \\ j, & \text{if } c_{n_j,n_s}(2i) = 0 \text{ and } c_{n_j,n_s}(2i+1) = 0 \\ -j, & \text{if } c_{n_j,n_s}(2i) = 0 \text{ and } c_{n_j,n_s}(2i+1) = 1 \end{cases}$$

where scrambling sequence $c_{n_j,n_s}(j)$, $j=0, \ldots 2S-1$ is initialized, at the start of a subframe, by the equation $c_{init}=(n_{RNTI}+1)((10n_f+\lfloor n_s/2\rfloor)\bmod 61+1)2^9+N_{ID}^{cell}$, where $c_{init}$ represents the initialization of the scrambling sequence, $n_{RNTI}$ represents a radio network temporary identifier (RNTI), $n_f$ represents a radio frame number, $n_s$ represents a slot number, and $N_{ID}^{Ncell}$ represents a cell identifier for a cell of a channel. Additionally, or alternatively, for a NPDCCH transmission, BS 110 may initialize the scrambling sequence by the equation $c_{init}=(N_{ID}^{Ncell}+1)((10n_f+\lfloor n_s/2\rfloor)\bmod 8192+1)2^9=N_{ID}^{cell}$.

At 510, BS 110 transmits the channel using the first processing scheme to provide interference randomization with one or more other cells. For example, BS 110 may transmit the channel to UE 120-1 and UE 120-2 using a resource allocation allocated for the channel. In some aspects, BS 110 may transmit a processing scheme indication indicating that the first processing scheme is applied to the channel. For example, BS 110 may transmit a SIB, an RRC reconfiguration message, and/or the like to identify the first processing scheme. In some aspects, BS 110 may transmit a single field to indicate that the first processing scheme is used for a plurality of UEs. For example, when BS 110 is providing channels to a plurality of carriers of the same type, BS 110 may provide a single field (e.g., a single bit) indicating that BS 110 is utilizing the first processing scheme for each of the plurality of carriers. In some aspects, BS 110 may transmit the processing scheme indication before transmitting the channel, concurrently with transmitting the channel, and/or the like to enable UE 120-1 and UE 120-2 to receive the channel and reverse the first processing scheme.

At 515, based at least in part on receiving the channel and identifying that the channel is processed using the first processing scheme, UE 120-1 and UE 120-2 each reverses the first processing scheme to receive data associated with the channel. For example, UE 120-1 may determine that a portion of the channel allocated for UE 120-1 includes control information for UE 120-1 based at least in part on reversing the first processing scheme applied to the channel. In this case, UE 120-1 may de-scramble the channel, de-rotate the channel, reverse an offset applied to the channel, and/or the like to recover the control information included in the channel. UE 120-2 may operate in a similar manner to recover control information, included in the channel, and intended for UE 120-2. In this way, BS 110 provides a control channel to UE 120-1 and UE 120-2 in an interference-limited scenario.

In FIG. 5B, and at 520, in a first scenario, based at least in part on identifying a second type of UE 120 operating in a cell, such as UE 120-3, BS 110 applies a second processing scheme for the channel. For example, based at least in part on UE 120-3 accessing the cell, UE 120-3 may provide a capability indication identifying a release of UE 120-3 or other capability indication to identify capabilities related to signal processing or interference cancellation, and BS 110 may determine to switch from using the first processing scheme that can be processed by the first type of UE and cannot be processed by the second type of UE to using the second processing scheme that can be processed by the first type of UE (e.g., UE 120-1 and UE 120-2) and can be processed by the second type of UE (e.g., UE 120-3).

At 525, BS 110 provides the channel using the second processing scheme for the channel. For example, BS 110 may transmit the channel to UE 120-1, UE 120-2, and/or UE 120-3 to convey control information to UE 120-1, UE 120-2, and/or UE 120-3. In some aspects, BS 110 may provide another processing scheme indication to identify the second processing scheme. For example, BS 110 may transmit a processing scheme indication indicating a switch from the first processing scheme to the second processing scheme before transmitting the channel using the second processing scheme, concurrent with transmitting the channel using the second processing scheme, and/or the like.

At 530, based at least in part on receiving the channel from BS 110 and identifying that the channel is processed using the second processing scheme, UE 120-1, UE 120-2, and UE 120-3 each reverses the second processing scheme to receive data associated with the channel. For example, UE 120-1, UE 120-2, and UE 120-3 may recover respective control information transmitted by BS 110. In this way, BS 110 ensures that UE 120-3 can receive and recover the channel although UE 120-3 is associated with the second type that cannot receive and recover an interference randomized channel.

In FIG. 5C, and at 535, in a second scenario, based at least in part on identifying the second type of UE 120 operating in the cell, BS 110 applies the first processing scheme and the second processing scheme for the channel. For example, BS 110 may apply the first processing scheme to the channel for transmission using a first search space of the cell, and may apply the second processing scheme to the channel for transmission using a second search space of the cell. Additionally, or alternatively, BS 110 may apply the first processing scheme for a first set of random access resources based at least in part on UE 120-1 and UE 120-2 accessing the cell using the first set of random access resources, and may apply the second processing scheme for a second set of random access resources based at least in part on UE 120-3 accessing the cell using the second set of random access resources.

At 540, BS 110 transmits the channel using the first processing scheme for the first search space and the second processing scheme for the second search space. In some aspects, BS 110 may transmit a processing scheme indication to indicate that the first processing scheme is used for the first search space and the second processing scheme is used for the second search space. Additionally, or alternatively, BS 110 may forgo transmission of a processing scheme indication based at least in part on the first type of UE (e.g., UE 120-1 and UE 120-2) being configured to receive the channel using the first search space and the second type of UE (e.g., UE 120-3) being configured to receive the channel using the second search space, which may conserve network resources relative to transmitting the processing scheme indication. In some aspects, BS 110 may transmit a first channel using the first processing scheme and a second channel using the second processing scheme concurrently.

At 545, based at least in part on receiving the channel from BS 110 and identifying that the channel is processed using the first processing scheme for the first search space and the second processing scheme for the second search space, UEs 120-1 and 102-2 and UE 120-3, respectively, each reverses the respective processing schemes to receive data associated with the channel (e.g., a first channel and a second channel). For example, UE 120-1, UE 120-2, and UE 120-3 may recover control information transmitted by BS 110. In this way, BS 110 ensures that UE 120-3 can receive and recover the channel, and BS 110 compensates for interference to provide the channel for UE 120-1 and UE 120-2. Moreover, based at least in part on performing the first processing scheme for the channel that is provided to the first type of UE, BS 110 provides interference randomization relative to another channel processed using the second processing scheme that is provided to the second type of UE, thereby compensating for interference for the second type of UE without the second type of UE being configured to receive a channel processed to compensate for interference.

As indicated above, FIGS. 5A-5C are provided as examples. Other examples are possible and may differ from what was described with respect to FIGS. 5A-5C.

FIG. 6 is a flow chart of a method 600 of wireless communication. The method 600 may be performed by a BS (e.g., which may correspond to one or more of BS 110, the apparatus 702/702', BS 1050, and/or the like).

At 610, in some aspects, the BS receives a capability indication from a user equipment associated with a cell (block 610). For example, the BS may receive a capability indication from a UE (e.g., which may correspond to one or more of UE 120, UE 750, the apparatus 1002/1002', and/or the like). In some aspects, the BS may identify a processing scheme for a channel of the cell based at least in part on the capability indication. In some aspects, the capability indication identifies a release version of the UE. Additionally, or alternatively, the capability indication may identify a UE interference cancellation capability, a processing capability, a UE classification (e.g., an MTC UE, an IoT UE, etc.), a sub-release version of the UE, a version of software operating on the UE, applications utilized on the UE, or the like. In some aspects, the release version may indicate the UE interference cancellation capability, the processing capability, etc. In some aspects, the capability indication may indicate UE support of a processing scheme associated with the release version. In some aspects, the capability indication may be an explicit indication of the UE being able to process a channel according to a processing scheme.

At 620, the BS identifies a type of a UE (block 620). For example, the BS may identify, based at least in part on the capability indication from the UE, the type of the UE. In some aspects, the type of the UE is determined based at least in part on a received configuration message or capability message, and the received configuration message or capability message includes the capability indication. In some aspects, the identification of the processing scheme is based at least in part on a type of a carrier, and the type of the carrier is associated with the first type of UE and not the second type of UE or associated with the first type of UE and the second type of UE.

At 630, the BS identifies a processing scheme for a channel of a cell based at least in part on a type of UE associated with the cell (block 630). For example, the BS may identify a processing scheme, such as a first processing scheme or a second processing scheme, for a control channel based at least in part on the type of UE operating in the cell, operating within a threshold proximity to the cell, such as within a proximity such that a transmission to the UE causes interference with a transmission to another UE operating in the cell, and/or the like. In some aspects, the processing scheme is identified from a first processing scheme that can be processed by a first type of UE and not a second type of UE or a second processing scheme that can be processed by the first type of UE and the second type of UE. In some aspects, the processing scheme relates to a scrambling sequence or a rotation sequence applied to the channel. In some aspects, the channel is an NPDCCH.

In some aspects, the processing scheme is identified based at least in part on a type of the channel. In some aspects, the type of the channel comprises a logical channel type. For example, a channel that is received by a first type of UE may use a first processing scheme, and a channel that is received by both the first type of UE and a second type of UE may use a second processing scheme. Additionally, or alternatively, a channel that is received by the first type of UE may comprise a multicast control channel (MCCH) or a multicast transport channel (MTCH). In some aspects, the channel includes a physical channel, a broadcast channel, a data channel, a shared channel, a control channel, a combination thereof, and/or the like.

At 640, the BS transmits the channel processed using the processing scheme based at least in part on identifying the processing scheme (block 640). For example, based at least in part on processing a control channel using a first processing scheme, a second processing scheme, and/or the like to apply a scrambling sequence or a rotation sequence to the control channel, the BS may transmit the control channel.

In some aspects, the channel includes a plurality of blocks; each block, of the plurality of blocks, includes repeating subsets of bits; each block, of the plurality of blocks, is processed using a first processing stage; each repetition of the repeating subsets of bits, for each block, is processed using a second processing stage such that a particular repetition of the repeating subset of bits of a first block and a corresponding particular repetition of the repeating subset of bits of a second block are processed using a common processing scheme; and the first processing stage and the second processing stage are each initialized based at least in part on a cell identifier for the cell. In some aspects, the channel includes a plurality of sets of symbols; each set of symbols, of the plurality of sets of symbols, is scrambled with a respective scrambling sequence of a plurality of scrambling sequences; each set of symbols, of the plurality of sets of symbols, is associated with at least one phase rotation; and the at least one phase rotation is based at least in part on a cell identifier for the cell.

In some aspects, the processing scheme is a scrambling scheme, and the scrambling scheme is based at least in part on a cell identifier for the cell and a subframe identifier for a subframe. In some aspects, a processing scheme indication, corresponding to the identified processing scheme, is provided to a UE of the cell. In some aspects, the processing scheme indication is broadcast in a SIB. In some aspects, the processing scheme indication is signaled using an RRC reconfiguration message.

In some aspects, a first channel, processed using the first processing scheme, is transmitted to a first UE of the first type based at least in part on providing a first processing scheme indication to the first UE; and a second channel, processed using the second processing scheme, is transmitted to a second UE of the second type based at least in part on providing a second processing scheme indication to the second UE.

In some aspects, a processing scheme indication for a carrier is provided to a UE. In some aspects, the processing scheme indication includes a single field that indicates the processing scheme to be used in a plurality of carriers of the same type. In some aspects, the type of the carrier is an anchor carrier or a non-anchor carrier (e.g., a non-anchor carrier for paging or random access). In some aspects, the channel may be a multicast control channel (MCCH) or a multicast traffic channel (MCTC).

In some aspects, the first processing scheme is used for a first one or more UEs that accessed the cell using a first set of random access resources, and the second processing scheme is used for a second one or more UEs that accessed the cell using a second set of random access resources. In some aspects, the channel, when processed using the first processing scheme, is transmitted using a first search space of the cell, and the channel, when processed using the second processing scheme, is transmitted using a second search space of the cell. In some aspects, a first channel, processed using the first processing scheme, and a second channel, processed using the second processing scheme, are transmitted concurrently. In some aspects, the channel is processed using cross-subframe coding, and the channel is processed without repetitions of portions of the channel.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
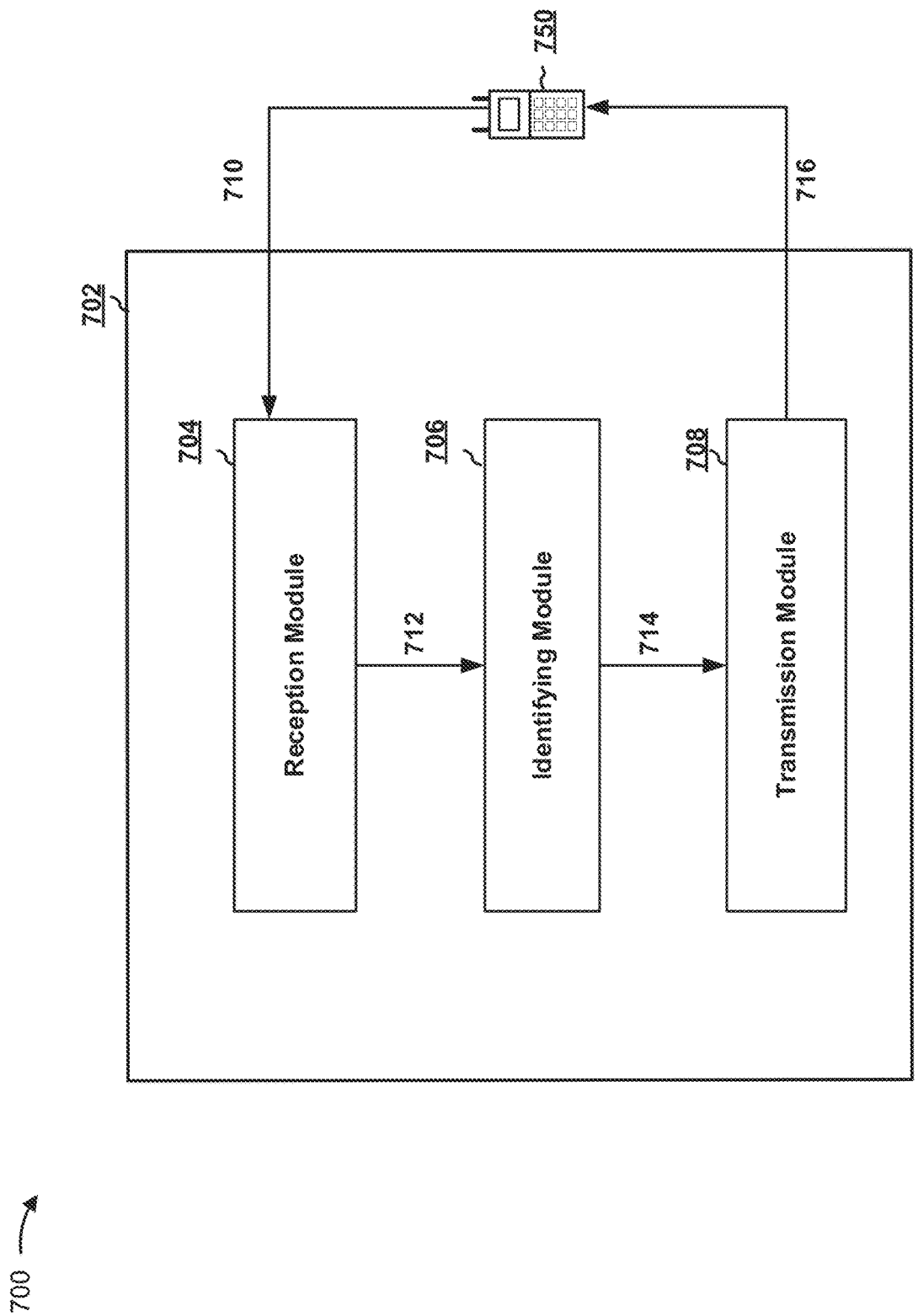
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus 702 may be a BS. In some aspects, the apparatus 702 includes a reception module 704, an identifying module 706, and/or a transmission module 708.

The reception module 704 may receive, from a UE 750 and as data 710, one or more signaling messages. For example, the reception module 704 may receive a capability indication from the UE 750 to permit the apparatus 702 to identify a type of the UE 750. In some aspects, the reception module 704 may receive a capability indication that identifies a release version of the UE 750 or another type of identifier that corresponds with whether the UE 750 can process a channel processed using a first type of processing scheme, a second type of processing scheme, and/or the like. In some aspects, the reception module 704 may receive control information associated with determining a set of scrambling sequences to apply to bits of a channel, a set of rotation sequences to apply to bits of a channel, and/or the like, such as from a network controller, as described herein.

The identifying module 706 may receive, from the reception module 704 and as data 712, information associated with identifying a processing scheme for a channel of a cell. For example the identifying module 706 may receive information identifying a type of the UE 750, and may identify the processing scheme for the channel of the cell based at least in part on the type of the UE 750. Additionally, or alternatively, the identifying module 706 may identify a scrambling sequence that is to be used by the apparatus 702 to scramble a portion of the channel, a rotation sequence that is to be used by the apparatus 702 to phase rotate a portion of the channel, and/or the like. In some aspects, the apparatus 702 may identify a cell identifier associated with a cell to utilize for a processing scheme that is to be applied to a channel. Based at least in part on identifying the processing scheme for the channel, the apparatus 702 may process the channel using the processing scheme.

The transmission module 708 may receive, from the identifying module 706 and as data 714, information associated with transmitting a channel (e.g., a control channel, such as a NPDCCH) to the UE 750. In some aspects, the transmission module 708 may receive information associated with transmitting a processing scheme indication identifying a processing scheme used to process the channel. The transmission module 708 may transmit, to the UE 750 and as data 716, the channel. For example, the transmission module 708 may transmit, as data 716 and to the UE 750, a control channel processed using a first processing scheme that can be processed by a first type of UE, a control channel using a second processing scheme that can be processed by a second type of UE, and/or the like. In some aspects, the transmission module 708 may transmit a first channel processed using the first processing scheme and a second channel processed using the second processing scheme concurrently, consecutively, and/or the like. In some aspects, the transmission module 708 may scramble and/or phase rotate bits and/or symbols of the channel to process the channel, and may transmit the channel based at least in part on processing the channel.

Figure 9:
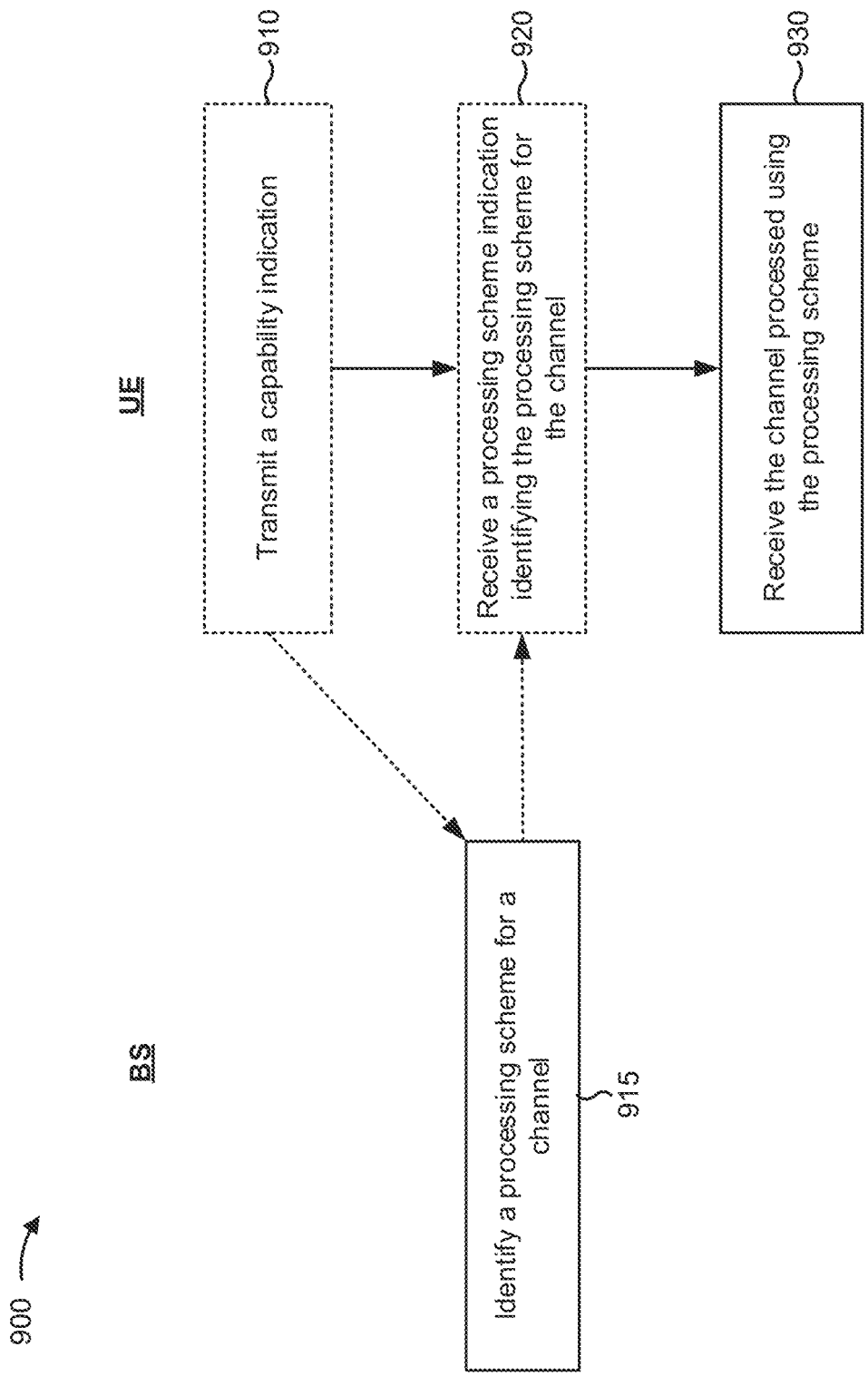
FIG. 9 is a flow chart of a method of wireless communication.

The apparatus may include additional modules that perform each of the blocks of the algorithm in the aforementioned flow chart of FIG. 6 and/or FIG. 9. As such, each block in the aforementioned flow chart of FIG. 6 and/or FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
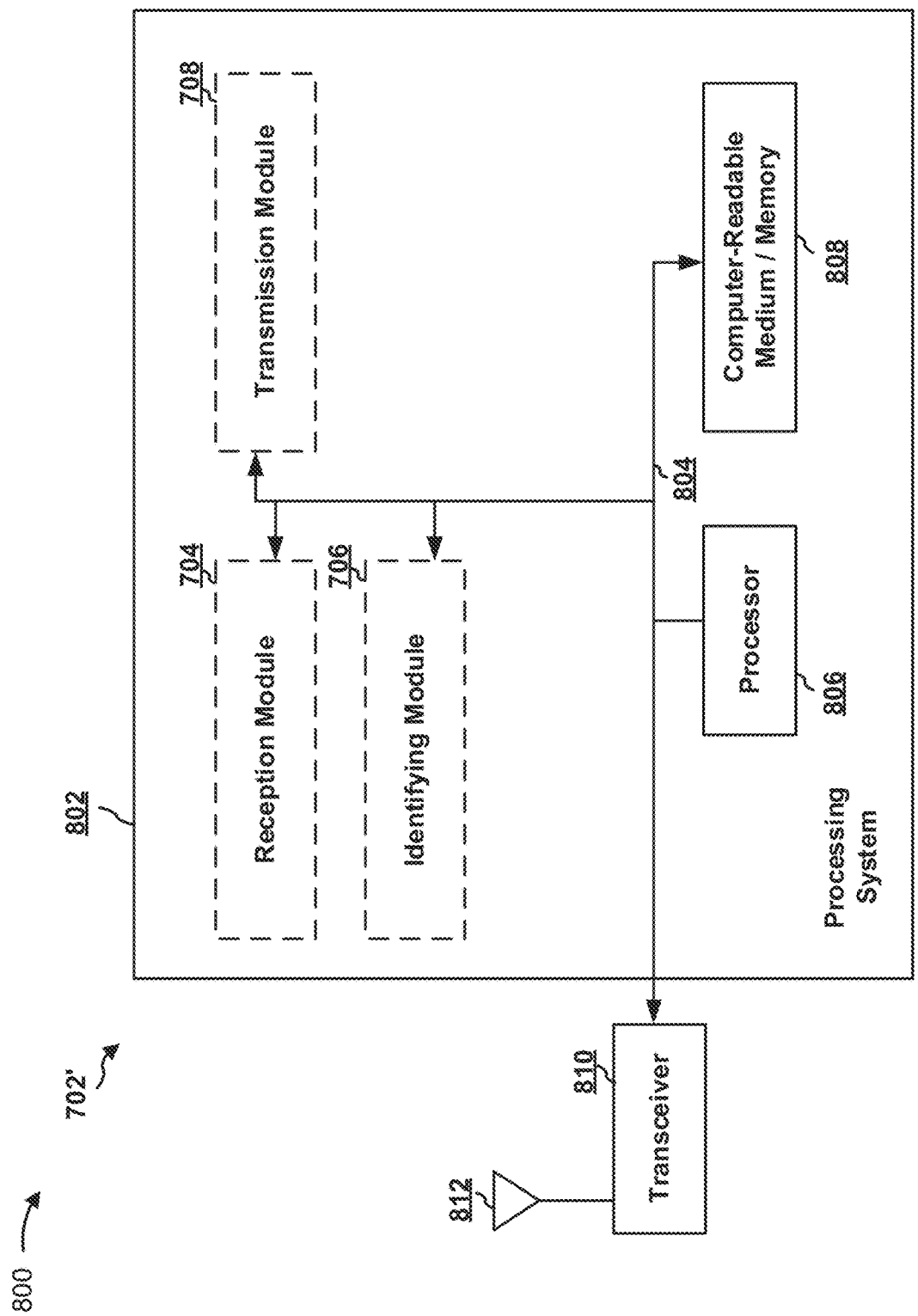
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a BS.

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704, 706, 708, and the computer-readable medium/memory 808. The bus 804 may also link various other circuits such as timing sources, peripherals, voltage regulators, and power management circuits, which are well known in the art, and therefore, will not be described any further.

The processing system 802 may be coupled to a transceiver 810. The transceiver 810 is coupled to one or more antennas 812. The transceiver 810 provides a means for communicating with various other apparatus over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802, specifically the transmission module 708, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described supra for any particular apparatus. The computer-readable medium/memory 808 may also be used for storing data that is manipulated by the processor 806 when executing software. The processing system further includes at least one of the modules 704, 706, and 708. The modules may be software modules running in the processor 806, resident/stored in the computer readable medium/memory 808, one or more hardware modules coupled to the processor 806, or some combination thereof. The processing system 802 may be a component of the BS 110 and may include the memory 242 and/or at least one of the transmit processor 220, the receive processor 238, and/or the controller/processor 240.

In some aspects, the apparatus 702/702' for wireless communication includes means for identifying a processing scheme for a channel of a cell based at least in part on a type of UE associated with the cell. The processing scheme may be identified from a first processing scheme that can be processed by a first type of user equipment and not a second type of user equipment or a second processing scheme that can be processed by the first type of user equipment and the second type of user equipment. The processing scheme may relate to a scrambling sequence or a rotation sequence applied to the channel. In some aspects, the apparatus 702/702' for wireless communication includes means for receiving a capability indication from a user equipment associated with a cell. In some aspects, the apparatus 702/702' for wireless communication includes means for transmitting the channel processed using the processing scheme based at least in part on identifying the processing scheme. The physical broadcast channel may include a plurality of blocks. In some aspects, the apparatus 702/702' for wireless communication includes means for receiving a capability indication from a UE associated with the cell. The processing scheme for the channel may be identified based at least in part on the capability indication. The aforementioned means may be one or more of the aforementioned modules of the apparatus 702 and/or the processing system 802 of the apparatus 702' configured to perform the functions recited by the aforementioned means. As described supra, the processing system 802 may include the transmit processor 220, the receive processor 238, and/or the controller/processor 240. As such, in one configuration, the aforementioned means may be the transmit processor 220, the receive processor 238, and/or the controller/processor 240 configured to perform the functions recited by the aforementioned means.

FIG. 8 is provided as an example. Other examples are possible and may differ from what was described in connection with FIG. 8.

FIG. 9 is a flow chart of a method 900 of wireless communication. The method may be performed by a UE (e.g., which may correspond to one or more of UE 120, UE 750, apparatus 1002/1002', and/or the like).

At 910, in some aspects, the UE may transmit a capability indication to a BS associated with a cell. For example, the UE may transmit the capability indication to a BS (e.g., which may correspond to one or more of BS 110, apparatus 702/702', BS 1050, and/or the like) to identify a type of the UE to the BS. In some aspects, the UE provides a configuration message or capability message, and the configuration message or capability message includes the capability indication. In some aspects, the capability indication identifies a release version of the user equipment.

At 915, in some aspects, the BS may identify a processing scheme for a channel (block 915). For example, the BS may identify the processing scheme based at least in part on a type of the UE. In some aspects, the BS may identify the processing scheme based at least in part on receiving the capability indication from the UE. In some aspects, the BS may provide a processing scheme indication to identify the processing scheme identified for the channel.

At 920, in some aspects, the UE may receive a processing scheme indication identifying a processing scheme for a channel. For example, the UE may receive the processing scheme indication from the BS to identify the processing scheme for the channel identified by the BS based at least in part on the type of the UE. In some aspects, the processing scheme indication is received in a system information block. In some aspects, the processing scheme indication is received in a radio resource control reconfiguration message.

At 930, the UE may receive a channel of the cell processed using a processing scheme identified based at least in part on the capability indication. For example, the UE may receive the channel, which has been processed using the processing scheme identified based at least in part on a type of the UE, from the BS. In some aspects, the processing scheme is identified from a first processing scheme that can be processed by a first type of user equipment and not a second type of user equipment or a second processing scheme that can be processed by the first type of user equipment and the second type of user equipment. In some aspects, the processing scheme relates to a scrambling sequence or a rotation sequence applied to the channel. In some aspects, the processing scheme is identified based at least in part on a type of a carrier, and the type of the carrier is associated with the first type of UE and not the second type of UE or associated with the first type of UE and the second type of UE. In some aspects, a processing scheme indication for the carrier is received by the UE. In some aspects, the processing scheme is identified based at least in part on a type of the channel.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
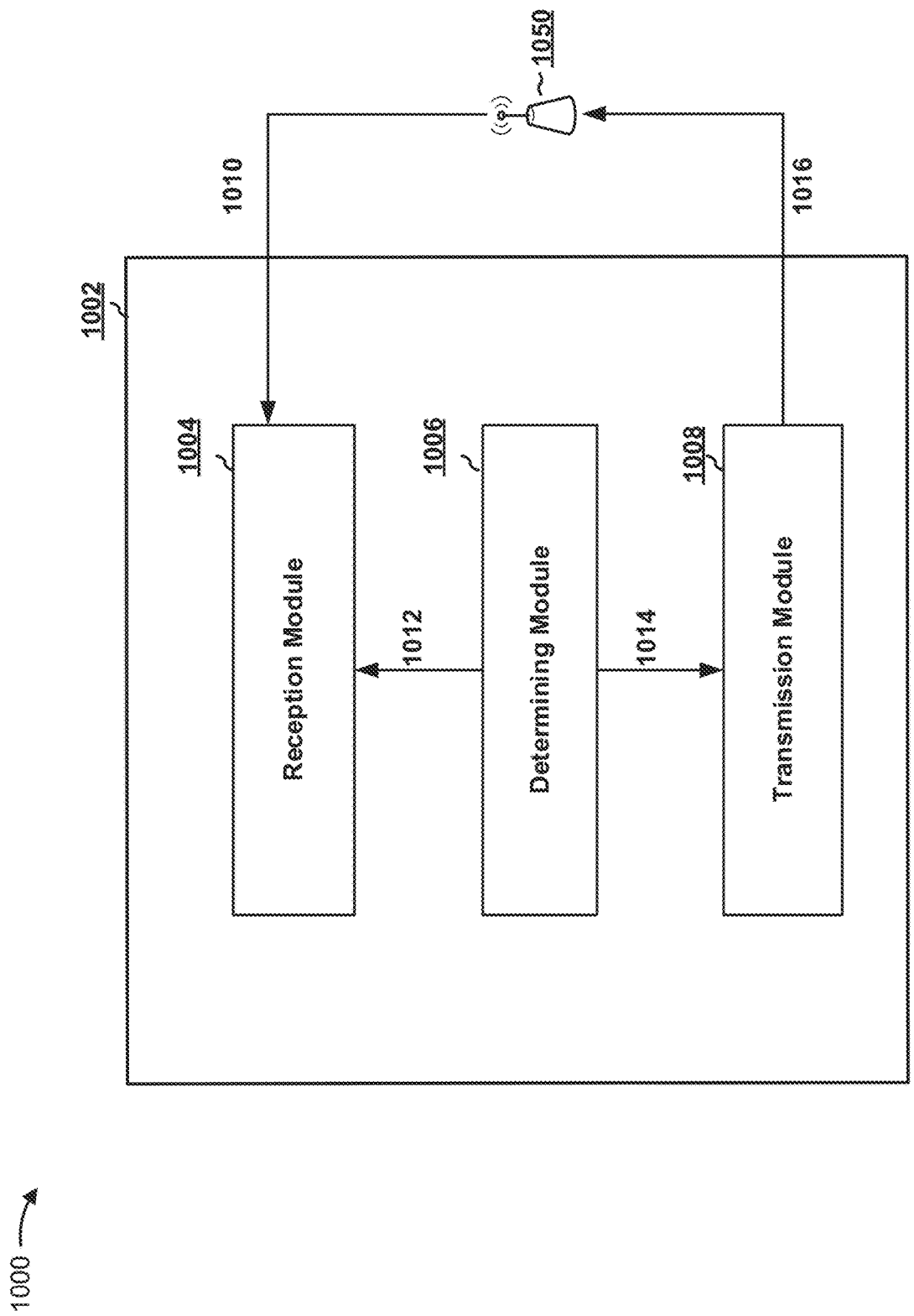
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, a determining module 1006, and/or a transmission module 1008.

The reception module 1004 may receive, from a BS 1050 and as data 1010, information associated with a channel (e.g., a control channel, such as a NPDCCH), and from determining module 1006 and as data 1012, information associated with receiving the channel. For example, the reception module 1004 may receive a channel processed using a first processing scheme that can be processed by a first type of UE, a control channel using a second processing scheme that can be processed by a second type of UE, and/or the like. Additionally, or alternatively, the reception module 1004 may receive information identifying the processing scheme, such as a processing scheme indicator that may be used to receive the channel and/or process the channel. In some aspects, the reception module 1004 may de-scramble and/or de-phase rotate bits and/or symbols of the channel to process the channel, and may receive the channel based at least in part on processing the channel.

The determining module 1006 may provide, as data 1012 and/or data 1014, information associated with a channel. For example, the determining module 1006 may provide information associated with receiving a channel processed using a processing scheme, such as information identifying a set of resources for the channel, a schedule for the channel, and/or the like. Additionally, or alternatively, the determining module 1006 may provide information identifying a type of the apparatus 1002, a capability of the apparatus 1002, and/or the like to enable the transmission module 1008 to provide a capability indication to the BS 1050 to enable the BS 1050 to identify the processing scheme for the channel.

The transmission module 1008 may transmit, to a BS 1050 and as data 1016, one or more signaling messages. For example, the transmission module 1008 may transmit a capability indication to the BS 1050 to permit the BS 1050 to identify a type of the apparatus 1002. In some aspects, the transmission module 1008 may transmit a capability indication that identifies a release version of the apparatus 1002 or another type of identifier that corresponds with whether the apparatus 1002 can process a channel processed using a first type of processing scheme, a second type of processing scheme, and/or the like.

The apparatus may include additional modules that perform each of the blocks of the algorithm in the aforementioned flow chart of FIG. 6 and/or FIG. 9. As such, each block in the aforementioned flow chart of FIG. 6 and/or FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
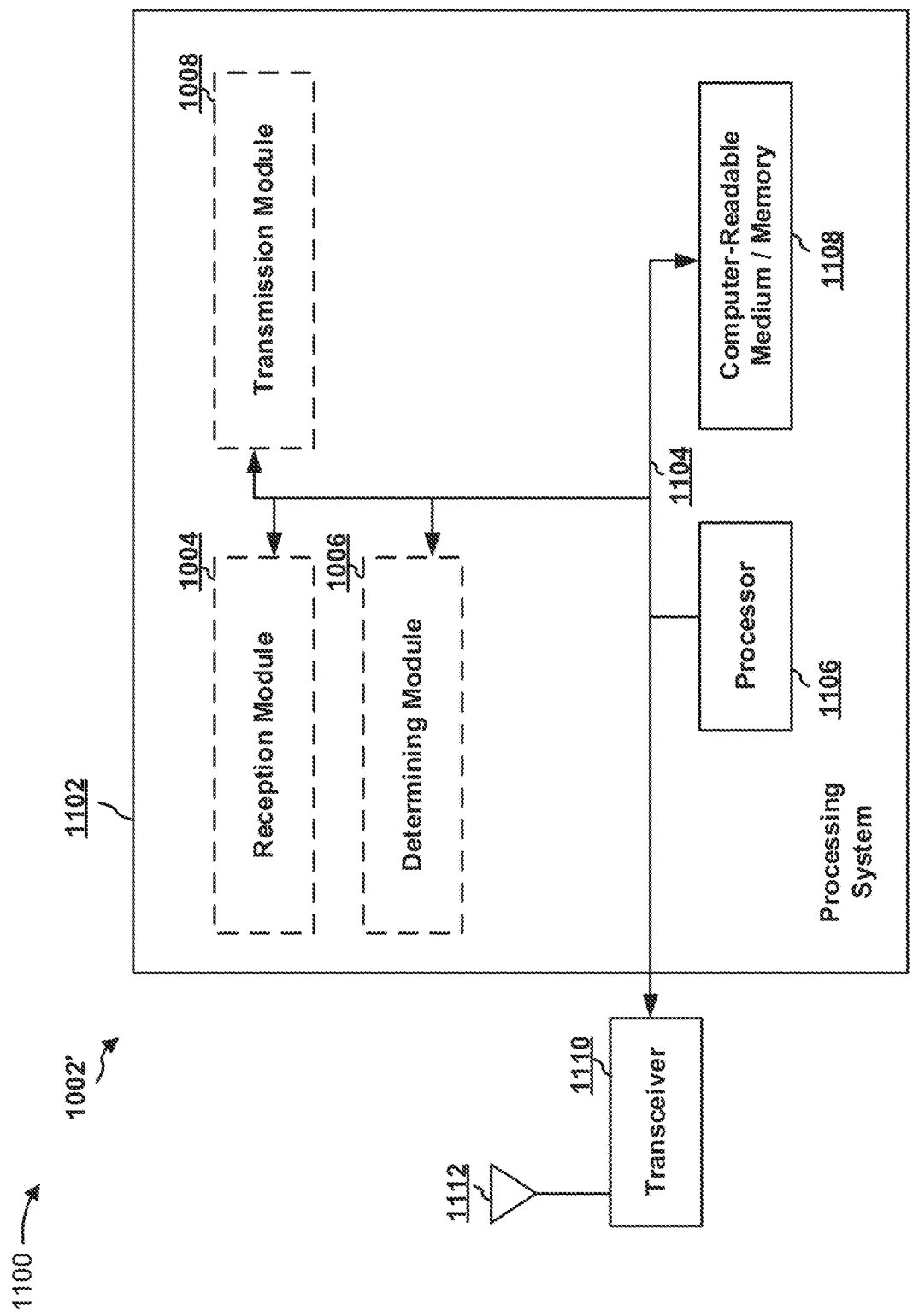
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1008, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, and 1008. The modules may be software modules running in the processor 1106, resident/stored in the computer readable medium/memory 1108, one or more hardware modules coupled to the processor 1106, or some combination thereof. The processing system 1102 may be a component of the UE 120 and may include the memory 282 and/or at least one of the TX MIMO processor 266, the RX processor 258, and/or the controller/processor 280.

In some aspects, the apparatus 1002/1002' for wireless communication includes means for transmitting a capability indication to a base station associated with a cell, means for receiving a channel of the cell processed using a processing scheme identified based at least in part on the capability indication, and/or the like. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 1100 is provided as an example. Other examples are possible and may differ from what was described in connection with FIG. 1100.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   identifying, by a base station, a type of a user equipment associated with a cell;
   identifying, by the base station, a processing scheme for a channel of the cell based at least in part on the type of the user equipment,
   wherein the processing scheme is identified from a first processing scheme that can be processed by a first type of user equipment and not a second type of user equipment or a second processing scheme that can be processed by the first type of user equipment and the second type of user equipment,
   wherein the processing scheme relates to a rotation sequence applied to the channel and comprises multiplying each complex valued symbol by $\theta_{n_p,n_s}(i)$; and
   transmitting, by the base station, the channel processed using the processing scheme based at least in part on identifying the processing scheme.

2. The method of claim 1, wherein the type of the user equipment is identified based at least in part on a capability indication received from the user equipment.

3. The method of claim 2, wherein the capability indication identifies a release version of the user equipment.

4. The method of claim 1, wherein a processing scheme indication, corresponding to the processing scheme, is provided to the user equipment of the cell.

5. The method of claim 4, wherein the processing scheme indication is signaled using a radio resource control reconfiguration message.

6. The method of claim 1, wherein the transmitting comprises:
   transmitting a first channel, processed using the first processing scheme, to a first user equipment of the first type based at least in part on providing a first processing scheme indication to the first user equipment; and
   transmitting a second channel, processed using the second processing scheme, to a second user equipment of the second type based at least in part on providing a second processing scheme indication to the second user equipment; and
   wherein the channel is the first channel or the second channel.

7. The method of claim 1, wherein the type of the user equipment is identified based at least in part on a received configuration message or capability message.

8. The method of claim 1, wherein the identification of the processing scheme is based at least in part on a type of a carrier; and
   wherein the type of the carrier is associated with the first type of user equipment and not the second type of user equipment or associated with the first type of user equipment and the second type of user equipment.

9. The method of claim 8, wherein the type of the carrier is an anchor carrier.

10. The method of claim 8, wherein the type of the carrier is a non-anchor carrier for paging or random access.

11. The method of claim 1, wherein the processing scheme is identified based at least in part on a type of the channel.

12. The method of claim 1, wherein a type of the channel is a multicast control channel or a multicast traffic channel.

13. The method of claim 1, wherein the first processing scheme is used for a first one or more user equipment that accessed the cell using a first set of random access resources; and
   wherein the second processing scheme is used for a second one or more user equipment that accessed the cell using a second set of random access resources.

14. The method of claim 1, wherein the channel, when processed using the first processing scheme, is transmitted using a first search space of the cell; or
   wherein the channel, when processed using the second processing scheme, is transmitted using a second search space of the cell.

15. The method of claim 1, wherein a first channel, processed using the first processing scheme, and a second channel, processed using the second processing scheme, are transmitted concurrently.

16. A device for wireless communication, comprising:
   memory; and
   one or more processors coupled to the memory, the memory and the one or more processors configured to:
     identify a type of a user equipment associated with a cell;
     identify a processing scheme for a channel of the cell based at least in part on the type of the user equipment,
     wherein the processing scheme is identified from a first processing scheme that can be processed by a first type of user equipment and not a second type of user equipment or a second processing scheme that can be processed by the first type of user equipment and the second type of user equipment,
     wherein the processing scheme relates to a rotation sequence applied to the channel comprises multiplying each complex valued symbol by $\theta_{n_p,n_s}(i)$; and transmit the channel processed using the processing scheme based at least in part on identifying the processing scheme.

17. The device of claim 16, wherein the type of the user equipment is identified based at least in part on a capability indication received from the user equipment.

18. The device of claim 17, wherein the capability indication identifies a release version of the user equipment.

19. The device of claim 16, wherein a processing scheme indication, corresponding to the processing scheme, is provided to the user equipment of the cell.

20. The device of claim 19, wherein the processing scheme indication is signaled using a radio resource control reconfiguration message.

21. A method for wireless communication, comprising:
receiving, by a user equipment and from a base station, a channel of a cell processed using a processing scheme identified based at least in part on a type of the user equipment,
wherein the processing scheme is identified from among a first processing scheme and a second processing scheme,
wherein the first processing scheme can be processed by a first type of user equipment and not a second type of user equipment,
wherein the second processing scheme can be processed by the first type of user equipment and the second type of user equipment,
wherein the processing scheme relates to a rotation sequence applied to the channel and comprises multiplying each complex valued symbol by $\theta_{n_f,n_s}(i)$.

22. The method of claim 21, further comprising:
receiving a processing scheme indication, corresponding to the processing scheme, from the base station.

23. The method of claim 21, further comprising:
transmitting a capability indication to a base station associated with the cell to indicate the type of the user equipment.

24. A user equipment for wireless communication, comprising:
memory; and
one or more processors coupled to the memory, the memory and the one or more processors configured to:
receive, from a base station, a channel of a cell processed using a processing scheme identified based at least in part on a type of the user equipment,
wherein the processing scheme is identified from among a first processing scheme and a second processing scheme,
wherein the first processing scheme can be processed by a first type of user equipment and not a second type of user equipment,
wherein the second processing scheme can be processed by the first type of user equipment and the second type of user equipment,
wherein the processing scheme relates to a rotation sequence applied to the channel and comprises multiplying each complex valued symbol by $\theta_{n_f,n_s}(i)$.

25. The user equipment of claim 24, wherein the one or more processors are further configured to transmit a capability indication to a base station associated with the cell to indicate the type of the user equipment.

26. The user equipment of claim 24, wherein the one or more processors are further configured to receive a processing scheme indication, corresponding to the processing scheme, from the base station.

* * * * *